Jan. 2, 1951 H. ABRAMSON 2,536,117
PRESSURE PAD FOR APPARATUS FOR MEASURING FORCES
Filed May 8, 1946

Hugo Abramson
by W. Bayard Jones
Attorney

Patented Jan. 2, 1951

2,536,117

UNITED STATES PATENT OFFICE 2,536,117

PRESSURE PAD FOR APPARATUS FOR MEASURING FORCES

Hugo Abramson, Eskilstuna, Sweden, assignor to Aktiebolaget C. E. Johansson, Eskilstuna, Sweden, a company of Sweden Application May 8, 1946, Serial No. 668,236
In Sweden May 16, 1945

9 Claims. (Cl. 73—141)

The present invention relates to a pressure pad for apparatus for measuring forces, particularly large forces, of the type in which, in a manner known per se, a force is measured by measuring, by means of a sensitive measuring instrument, the compression which the force produces in a body of metal or similar resistant material. With apparatus of this kind as heretofore used it has proved to be difficult to obtain accurate values of the force that it is desired to measure, owing to the fact that the compression of the metal body or the like becomes dependent upon the shape of the surfaces between which the body is compressed, as well as upon the manner in which the force is distributed over the said surfaces, and further upon how strongly those bodies are dimensioned which transmit the force to the metal body.

It is the purpose of this invention to obviate these difficulties by applying a special pressure pad to each end of the metal body or the like. This pressure pad is principally characterized by it being provided with a thrust block or plate which serves to transmit the force to the body to be compressed, and which is elastically or resiliently supported in a counterplate or the like in such manner that the thrust plate is capable of adjusting itself within certain limits in different angular positions relatively to the direction in which the force to be measured acts upon said counterplate or the like. In this way the force will always become correctly distributed over the surfaces of the thrust plates and thus also over the end surfaces of the body to be compressed. The elastic pressure medium supporting the thrust plate may suitably consist of a substance which is non-fluid or very viscous at ordinary room temperature and atmospheric pressure, such as crude rubber or pitch, and which, at the high pressures here concerned, becomes sufficiently plastic to allow the desired angular adjustment of the thrust plate.

Figure 1:
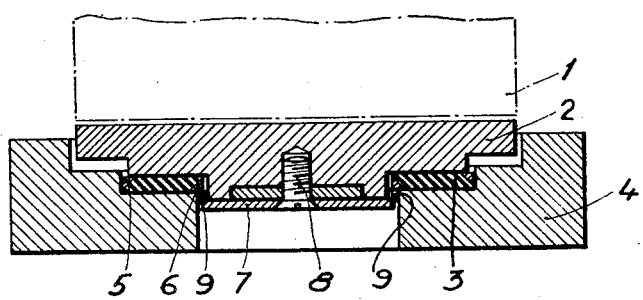
Figure 2:
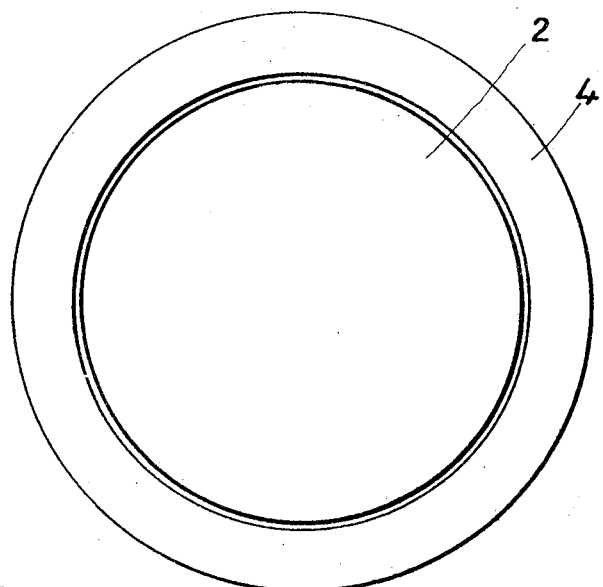
Figure 3:
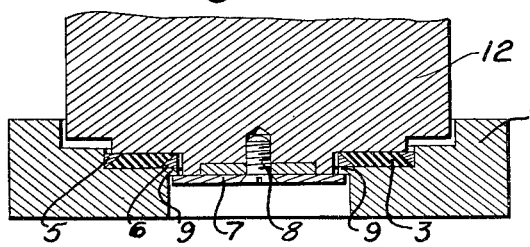

The accompanying drawing illustrates by way of example two constructional forms of the invention. Fig. 1 is a section through a pressure pad according to the invention for a force measuring apparatus of the kind here concerned, and Fig. 2 shows the pressure pad viewed from above. Fig. 3 shows, in a manner similar to Fig. 1, a second constructional form.

In the constructional form illustrated in Figs. 1 and 2, I denotes the metal body which shall be subjected to compression by the force to be measured, and which is assumed to consist of a short cylinder having a comparatively large diameter.

The pressure pad illustrated consists of a thrust block or plate 2 which, in the instance illustrated, has the same diameter as the body 1, and which rests on an annular rubber plate or washer 3 which is confined between the thrust plate 2 and a counterplate 4, shown in this instance as a ring having a stepped interior surface, by means of two sealing rings 5 and 6. The thrust plate 2 is retained to the counterplate, so that they cannot separate, by means of a washer 7 which bears against a flange 9 in the counterplate 4, and which is attached to the thrust plate 2 by means of a screw 8. As shown in the drawing, there is a certain play between the thrust plate 2 and the counterplate 4, so that the thrust plate can adjust itself to the body 1. During the measuring operation the rubber plate 3 is subjected to so large a pressure that it becomes sufficiently plastic to allow the required angular adjustment of the thrust plate 2 relatively to the counterplate 4, and for this reason it is necessary to use the sealing rings 5 and 6 in order to prevent the rubber from being forced out through the spaces between the thrust plate 2 and the counterplate 4.

During the measuring operation a pressure pad as above described is placed with its thrust plate 2 against each end of the metal body 1, so that the latter is compressed between the two pressure pads, one of which is placed, for instance, on a rigid support, while the force to be measured is allowed to act upon the other pad. The deformation of the body 1 will then be dependent solely upon the force and upon the shape and size of the thrust plates 2. The force to be measured is thus the only unknown magnitude, and therefore, it can be obtained with great accuracy from the compression of the body. The pressure pad above described may be used with all kinds of pressure measuring apparatus of the type above referred to, irrespective of what measuring instrument is used for measuring the compression of the body 1. The measuring instrument may consist, for instance, of an ordinary indicator instrument to the indicator of which the changes of dimension of the body 1 are transmitted through purely mechanical means, or of an electric measuring instrument in which case the transmitting elements may consist, for instance, of a condenser, or of a quartz crystal, which converts the changes of dimension of the body into variations of potential.

The constructional form above described and illustrated in the drawing is only to be regarded as an example and may be modified in several ways as regards its details without departing from the principle of the invention. For instance, the pressure pad illustrated may be modified, if desired, in such manner that the body 1, the compression of which is to be measured, forms at one of its ends, an elastically or resiliently supported thrust plate, that is to say, so that the thrust plate 2 is made integral with the body 1. This modified constructional form is illustrated in Fig. 3 in which 12 denotes the body of the measuring apparatus which also forms a thrust plate of the pressure pad. In other respects this constructional form is similar to that above disclosed, and the same reference numerals are used to denote corresponding parts.

I claim:

1. A pressure pad for an apparatus for measuring forces by measuring the compressive deformation produced by a force in a body of a resistant material such as metal, comprising in combination two substantially plate-shaped members having opposed substantially flat surfaces, an annular body of plastic material interposed between said substantially flat surfaces on said members and floatingly supporting one of said members on the other member in such manner that said members are held spaced from an entirely out of contact with one another, whereby said members are capable of movement and adjustment relatively to one another in all directions due to plastic deformation of said body, and a wall structure associated with one of said members and surrounding said body and a cylindrical portion projecting from the other of said members and passing through said annular plastic body so as to retain said body between said surfaces on said members.

2. A pressure pad for an apparatus for measuring forces by measuring the compressive deformation produced by a force in a body of a resistant material such as metal, comprising in combination two substantially plate-shaded members having opposed substantially flat surfaces, a body of a plastic material interposed between said substantially flat surfaces to maintain said surfaces spaced from and entirely out of contact with one another and floatingly supporting one of said members on the other of said members, whereby said members are capable of movement and adjustment relatively to one another in all directions due to plastic deformation of said body, a wall structure associated with one of said members and spaced from the other of said members and surrounding said body so as to retain the same between said surfaces on said members, and a metal sealing ring separate from both of said plate members and cooperatiing with said wall structure on one of said members and with said plane surface on the other of said members and with said plane surface on the other of said members to seal the space between said last-mentioned member and said wall structure.

3. A pressure pad for an apparatus for measuring forces by measuring the compressive deformation produced by a force in a body of a resistant material such as metal, comprising in combination a thrust plate for such body, a counterplate having a recess in one face thereof adapted to receive said thrust plate and spaced from said thrust plate at all points, an annular body of a plastic material positioned in said recess in said counterplate to maintain said spacing and floatingly supporting said thrust plate in said counterplate, whereby said thrust plate is capable of movement and adjustment relatively to said counterplate in all directions, said thrust plate having a substantially cylindrical projecting portion passing through said annular body whereby said body may be confined between said thrust plate and said counterplate to limit the axial movement of said thrust plate toward said counterplate.

4. A pressure pad for an apparatus for measuring forces by measuring the compressive deformation produced by a force in a body of a resistant material such as metal, comprising in combination a thrust plate for such body, a counterplate having a recess in one face thereof, a body of a plastic material positioned in said recess in said counterplate and floatingly supporting said thrust plate in said counterplate, said thrust plate having such dimensions and configuration relatively to said counterplate that when supported on said plastic body said thrust plate is spaced from and entirely out of contact with said counterplate, whereby said thrust plate is capable of movement and adjustment relatively to said counterplate in all directions, and a metal sealing ring serving to close the space between said thrust plate and the wall of said recess in said counterplate and to confine said plastic body between said plates.

5. A pressure pad for an apparatus for measuring forces by measuring the compression produced by a force in a body of a resistant material such as metal, as defined in claim 4, wherein the thrust plate is made integral with the said body.

6. A pressure pad for an apparatus for measuring forces by measuring the compressive deformation produced by a force in a body of a resistant material such as metal, comprising in combination a thrust plate for such body, a counterplate, said thrust plate and said counterplate having opposed substantially flat surfaces, said flat surface on said counterplate forming the bottom surface of a recess in said counterplate, a body of a plastic material positioned in said recess in said counterplate between said flat bottom surface thereof and said flat surface on said thrust plate and floatingly supporting said thrust plate in said counterplate, said thrust plate having such dimensions and configuration relatively to said counterplate that when supported on said plastic body said thrust plate is spaced from and entirely out of contact with said counterplate, whereby said thrust plate is capable of movement and adjustment relatively to said counterplate in all directions, and a metal sealing ring cooperating with said substantially flat surface on said thrust plate annd with the wall of said recess in said counterplate and serving to close the space between said thrust plate and said counterplate and to confine said plastic body between said plates.

7. A pressure pad for an apparatus for measuring forces by measuring the compressive deformation produced by a force in a body of a resistant material such as metal, comprising in combination a thrust plate for such body, a counterplate, said thrust-plate and said counterplate having opposed substantially flat annular surfaces, said annular surface on said counterplate forming the bottom surface of a recess in said counterplate, a substantially annular body of a plastic material positioned in said recess in said counterplate between said annular bottom surface thereof and said annular surface on said thrust plate and floatingly supporting said thrust plate in said counterplate, said thrust plate having such dimensions and configuration relatively to said counterplate that when supported on said annular plastic body said thrust plate is spaced from and entirely out of contact with said counterplate, whereby said thrust plate is capable of movement and adjustment relatively to said counterplate in all directions, and outer and inner metal sealing rings cooperating with said substantially flat surfaces on said thrust plate and said counterplate and serving to close the spaces between said thrust plate and said counterplate and to confine said annular plastic body between said plates.

8. A pressure pad as defined in claim 7, wherein said counterplate is provided with a central opening, an interior flange in said opening in said counterplate, and a washer attached to said thrust plate and bearing against said flange to retain such thrust plate to said counterplate.

9. A pressure pad for an apparatus for measuring forces by measuring the compressive deformation produced by a force in a body of a resistant material such as metal, comprising in combination a thrust plate for such body, a counterplate having in one face thereof a recess providing a supporting surface disposed substantially perpendicular to the direction of intended application of said force and a peripheral wall therefor, a body of plastic material disposed in said recess, said thrust plate having a projecting portion of smaller cross section than the cross section of said recess, said projecting portion providing a thrust surface resting on said body of plastic material, the edges of said thrust surface being laterally spaced from said peripheral wall to permit lateral and angular movement of said surfaces in respect to each other, and a sealing ring disposed between said surfaces and engaged by said thrust plate and extending laterally beyond said thrust surface to confine said plastic body in the space between said surfaces.

HUGO ABRAMSON.

REFERENCES CITED

The following references are of record in the file of this patent:

UNITED STATES PATENTS

| Number | Name | Date |
|---|---|---|
| 1,033,623 | Schiller | July 23, 1912 |
| 1,622,713 | Gillespie | Mar. 29, 1927 |
| 1,994,388 | Erichsen | Mar. 12, 1935 |
| 2,108,746 | Erichsen | Feb. 15, 1938 |
| 2,125,483 | Blanchard | Aug. 2, 1938 |
| 2,346,281 | Templin | Apr. 11, 1944 |
| 2,406,601 | Fyler | Aug. 27, 1946 |

FOREIGN PATENTS

| Number | Country | Date |
|---|---|---|
| 657,176 | Germany | Feb. 25, 1938 |